United States Patent
Sanchez Herrero et al.

(10) Patent No.: US 7,296,078 B2
(45) Date of Patent: Nov. 13, 2007

(54) USER SELECTOR PROXY, METHOD AND SYSTEM FOR AUTHENTICATION, AUTHORIZATION AND ACCOUNTING

(75) Inventors: Juan Antonio Sanchez Herrero, Madrid (ES); Anna Maria Lopez Nieto, Madrid (ES); John Michael Walker, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 989 days.

(21) Appl. No.: 10/410,336

(22) Filed: Apr. 9, 2003

(65) Prior Publication Data
US 2003/0217285 A1    Nov. 20, 2003

(30) Foreign Application Priority Data
Apr. 22, 2002   (EP)   .................................. 02076564

(51) Int. Cl.
*G06F 15/173*   (2006.01)

(52) U.S. Cl. ...................... 709/229; 709/202; 709/203; 709/223; 709/224; 709/225; 709/227

(58) Field of Classification Search ................ 709/229, 709/202, 203, 223, 224, 225, 227
See application file for complete search history.

(56) References Cited

U.S. PATENT DOCUMENTS

| 6,298,383 | B1 | 10/2001 | Gutman et al. |
| 6,748,543 | B1* | 6/2004 | Vilhuber ........................ 726/8 |
| 2002/0103910 | A1* | 8/2002 | Le Lay et al. .............. 709/227 |

FOREIGN PATENT DOCUMENTS

| WO | WO99/29095 | 6/1999 |
| WO | WO 01/31843 | 5/2001 |

\* cited by examiner

*Primary Examiner*—Quynh H. Nguyen

(57) ABSTRACT

The basic problem addressed by the present invention is the free disposition of users, without restrictions on users identifiers, among a plurality of AAA-servers within an ISP network for allowing AAA-service network scalability and for hiding the AAA-service network configuration to external AAA-clients. The present invention solves the problem discussed above by placing a User Selector Proxy as entry point to the AAA-service network within an ISP network, the User Selector Proxy responsible for determining an AAA-server in charge of the user and able to direct AAA-service requests to the appropriate AAA-server.

17 Claims, 6 Drawing Sheets

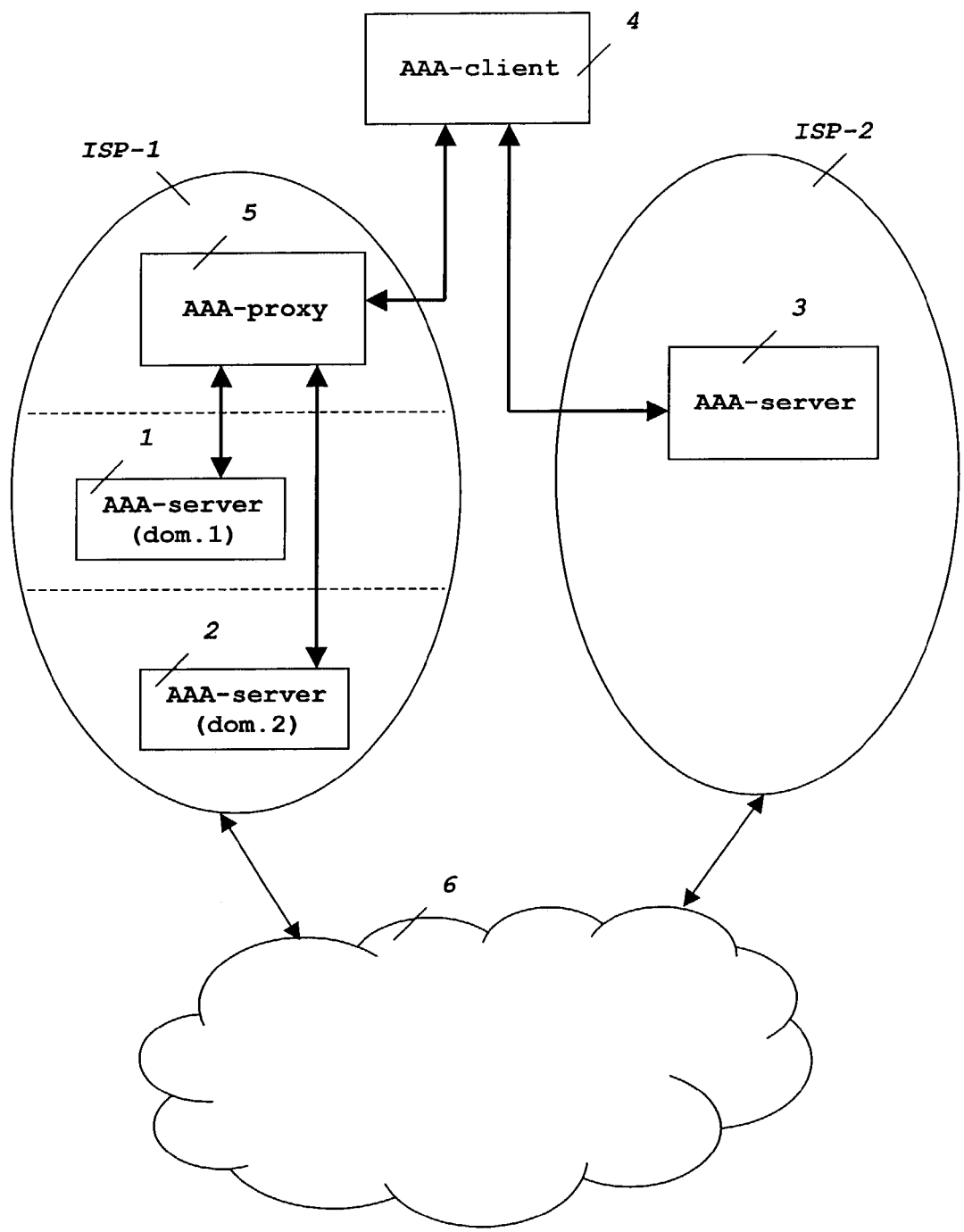
FIG.-1-
Related art

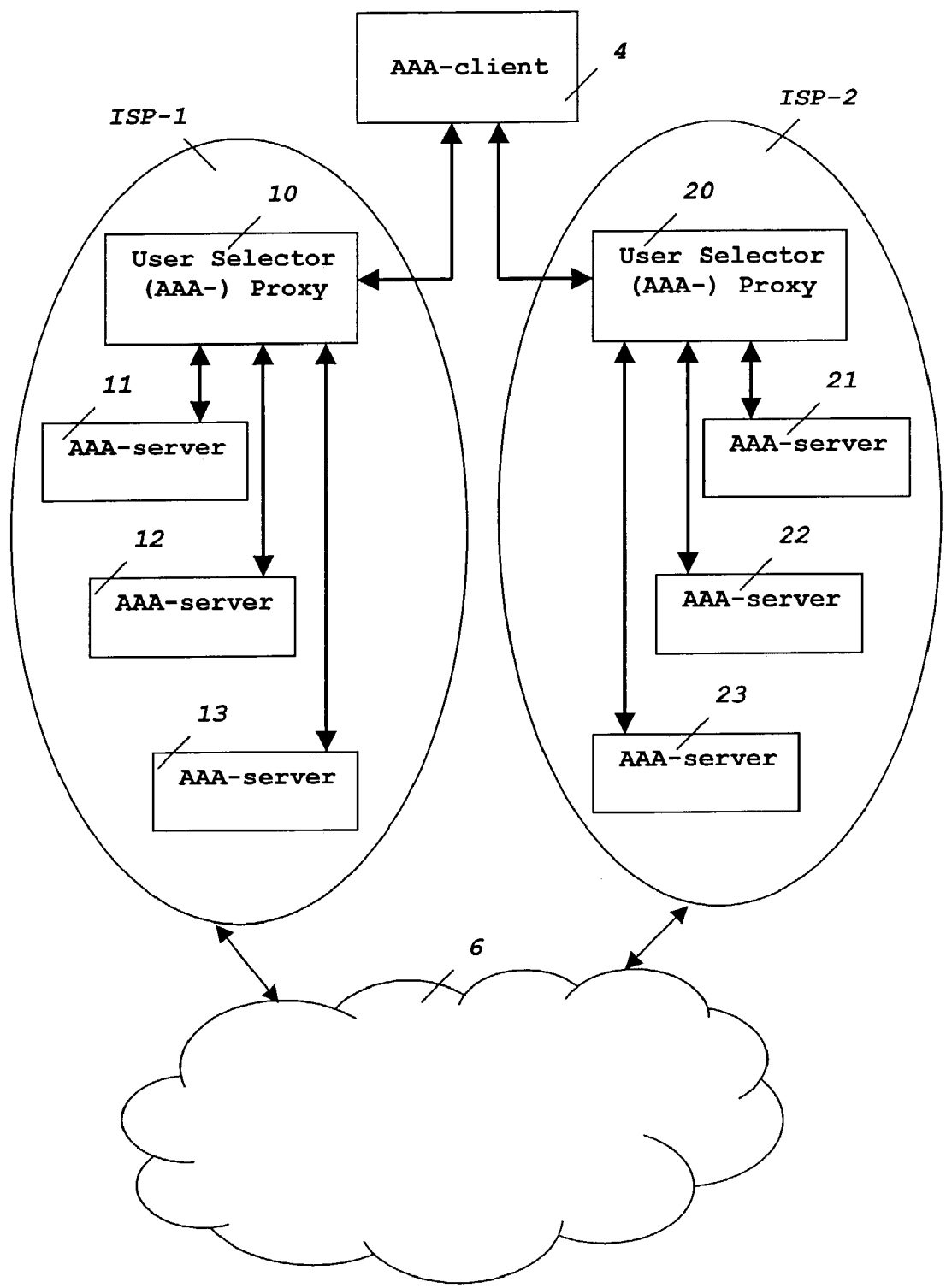
FIG. -2-

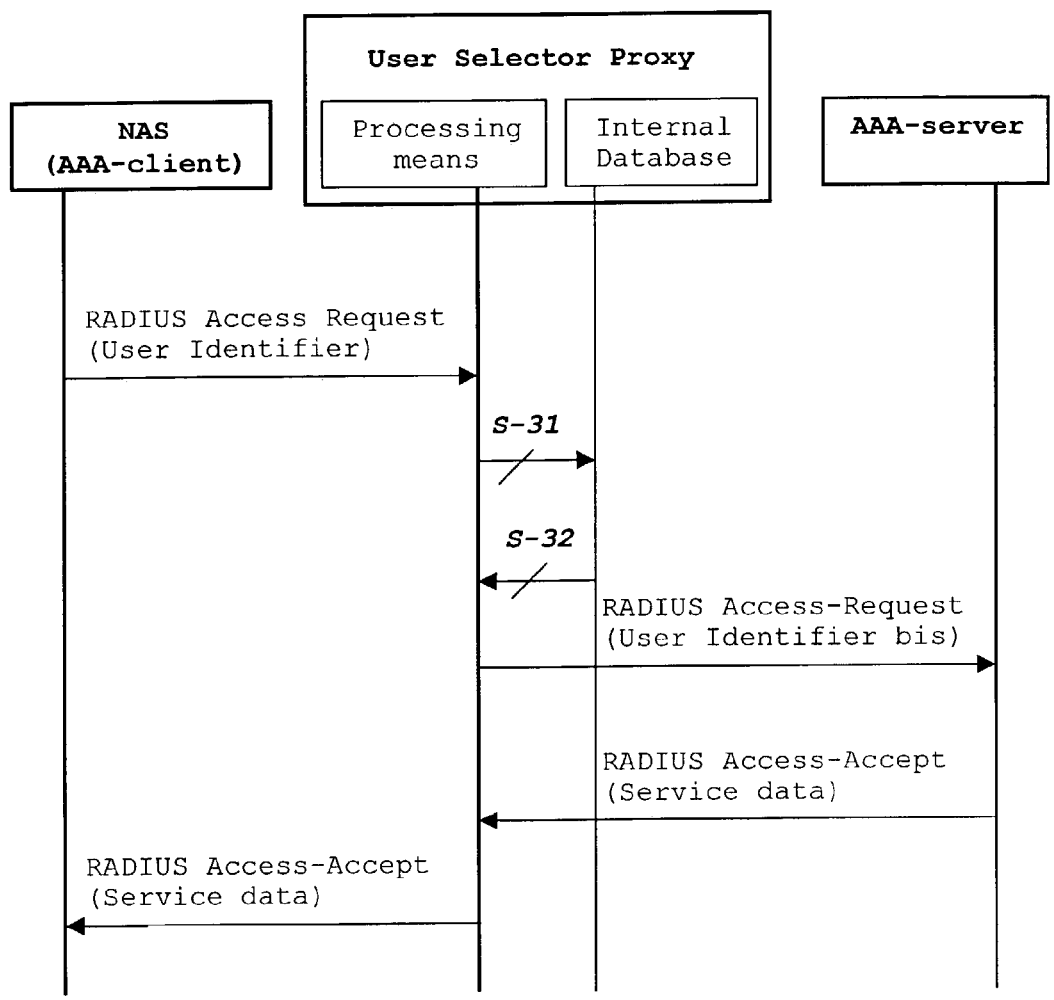
FIG.-3-

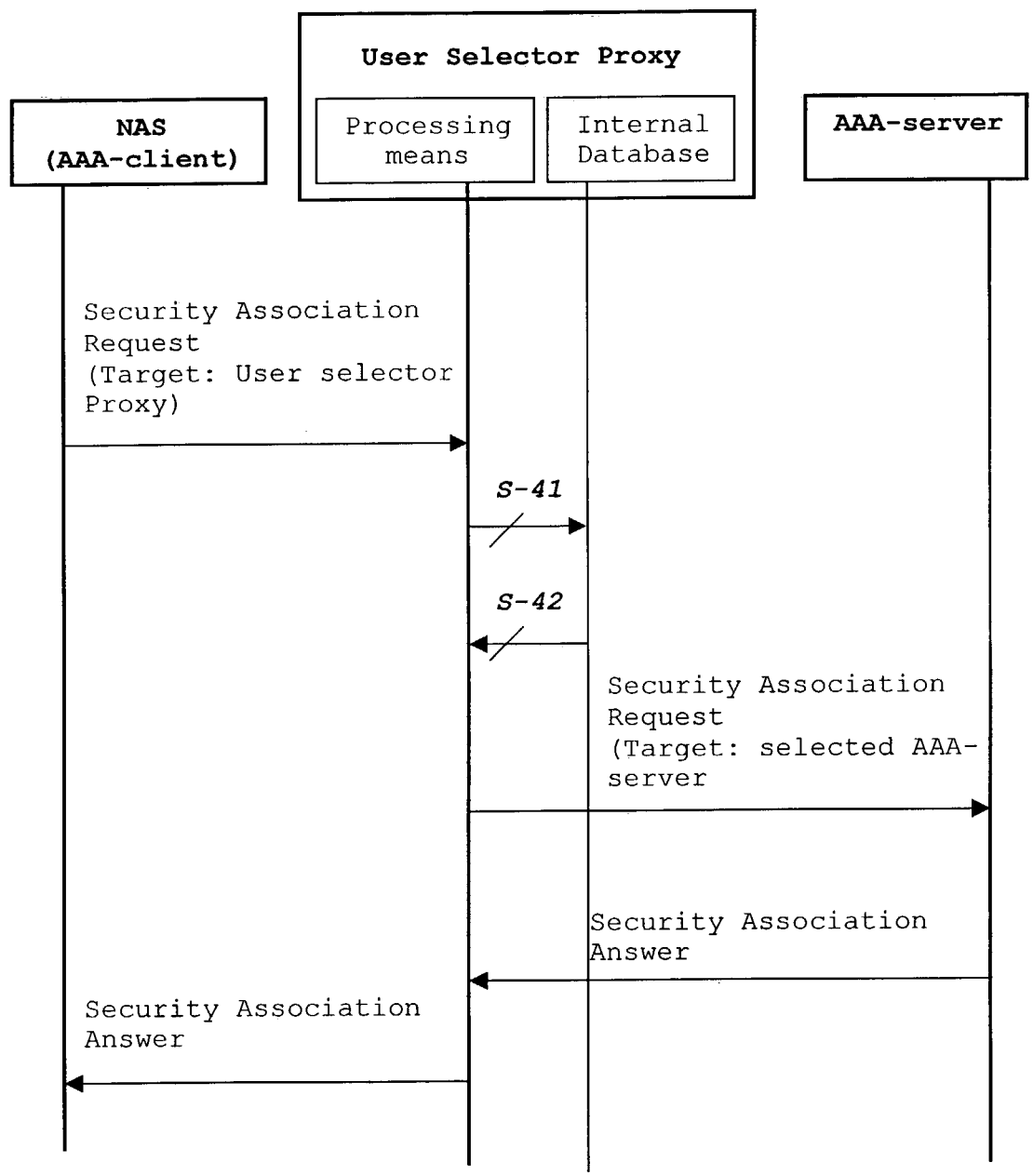
FIG.-4-

| User Selector Proxy disposition table | | | | |
|---|---|---|---|---|
| User Identifier | Group | New User-Name | New Realm | AAA-server Identifier |
| User-1@Realm.1 | Gr-1 | User-A | None | |
| User-2@Realm.1 | Gr-2 | None | None | |
| User-1@Realm.2 | None | User-5 | Realm-5 | AAA-s1, AAA-s3 |
| User-2@Realm.2 | Gr-1 | User-B | None | |
| User-3@Realm.2 | Gr-2 | User-5 | Realm-5 | |
| User-1@Realm.3 | None | None | None | AAA-s1 |
| User-2@Realm.3 | None | User-5 | None | AAA-s2 |
| 123456xxxxxx | None | None | Realm-6 | AAA-s4, AAA-s3 |
| 456xxxxxxx | None | 123456 | None | AAA-s2, AAA-s1 |
| 9.8.7@Realm.3 | Gr-1 | None | Realm-6 | |
| Gr-1 | None | None | Realm-5 | AAA-s3, AAA-s4 |
| Gr-2 | None | None | None | AAA-s1 |

FIG.-5a-

| Traditional AAA-Proxy routing table | |
|---|---|
| User domain | AAA-server Identifier |
| Realm.1 (abc.com) | AAA-server-1 |
| Realm.2 (def.com) | AAA-server-2 |
| Realm.3 (ghi.com) | AAA-server-3 |

FIG.-5b-
Related art

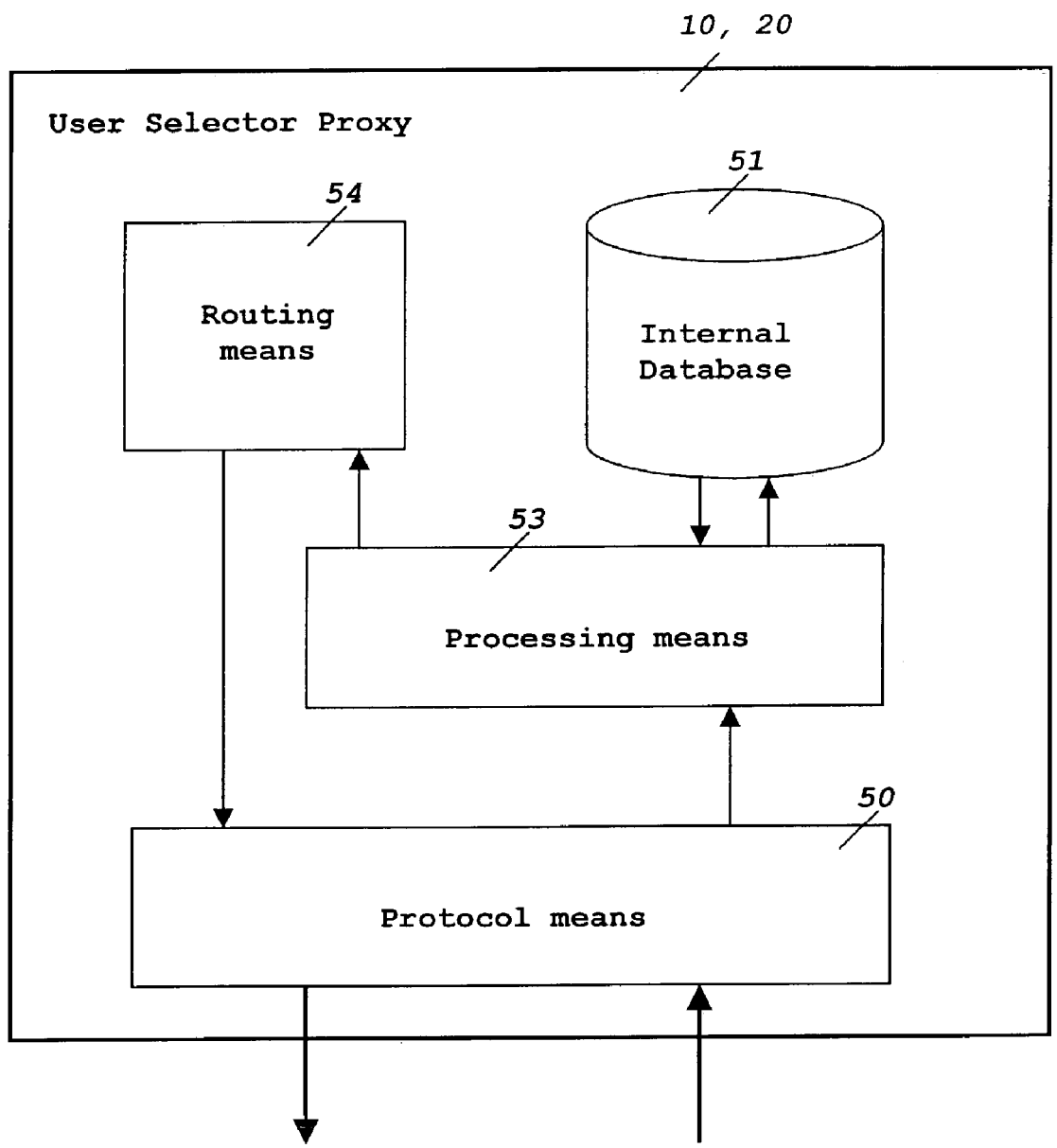
FIG.-6-

USER SELECTOR PROXY, METHOD AND SYSTEM FOR AUTHENTICATION, AUTHORIZATION AND ACCOUNTING

CROSS-REFERENCE TO RELATED APPLICATIONS

This application claims the benefit of the filing date as provided by 35 U.S.C. 119 of European patent application number 02076564.0 filed on Apr. 22, 2002, the disclosure of which is incorporated herein by reference.

BACKGROUND OF THE INVENTION

The present invention generally relates to a telecommunication network coupled to a serving network of an Internet Service Provider (ISP) for carrying out the authentication, authorization and accounting of remote-access users. More particularly, the invention pertains to means, system and method for enabling networks of the above type to determine the appropriate Authentication, Authorization and Accounting server (hereinafter referred to as an AAA-server) in charge of a user having issued a service request.

The access to Internet services is nowadays given by an ISP. In the most general scenario, different operators manage the ISP network and the access network. Both networks are thus considered separate networks. The ISP performs authentication, authorization and accounting checks on users accessing its services via an access network. In particular, these users are subscribers of a telecommunication network acting as an access network to the ISP network.

Thus, when a user of a telecommunication network wishes to connect with a certain server that belongs to an ISP, a service request is sent from the user to said ISP server via a Network Access Server (NAS), which belongs to the telecommunication network. Nevertheless, said user must be previously authenticated and said service request must be previously authorized by an entity such as an Authentication, Authorization and Accounting server (AAA-server). To this end, when the user sends a service request toward the NAS he also enters a user identifier and a password for his own identification. This information is sent toward the AAA-server using a communication protocol such as the Remote Authentication Dial In User Service (generally known as RADIUS), or the RADIUS upgrading known as DIAMETER protocol, or the like.

The Internet Engineering Task Force (IETF) defines the RADIUS protocol in RFC 2865. Likewise, the DIAMETER protocol is defined in "draft-ietf-aaa-diameter-08.txt" which is also driven by IETF. The basic concept behind DIAMETER is to provide a base protocol that can be extended in order to provide AAA-services for new access-related technologies. Both RADIUS and DIAMETER specifications describe protocols suitable for carrying out the authentication and authorization as well as for collecting the accounting information between the NAS and the AAA-server where the NAS desires to authenticate its links.

Provided that the protocol used is RADIUS, when a NAS operating as a client of a RADIUS AAA-server receives an incoming service request, said NAS obtains identification information from the user, namely a Name and a Password, and then issues an authentication request to the RADIUS AAA-server. The RADIUS AAA-server, upon receiving the identification information and other NAS information, authenticates the user. That is, depending on who the user is, he is authorized to have access to different services and possibilities. The RADIUS attributes carry the specific authentication and authorization data as well as information and configuration details for the request and reply packets.

For instance, attributes that can be carried in these packets are the User-Name, User-Password, and others. In particular, the attribute User-Name indicates the name of the user to be authenticated. The format of this User-Name in the RADIUS protocol may be one of several forms:

Text, a form consisting only of UTF-8 encoded characters
Network Access Identifier (NAI), namely username@realm, as described in RFC 2486
Distinguished Name (DN), which is a name in ASN.1 form used in Public Key authentication systems On the other hand, when DIAMETER is the protocol used, the procedure is similar to the previous case. A NAS acting as a client of a DIAMETER AAA-server initiates a request for authentication and/or authorization of a given user towards said DIAMETER AAA-server. The DIAMETER AAA-server, upon receiving the identification information and other NAS information, authenticates the user. That is, depending on who the user is, he is authorized to have access to different services and possibilities.

Any data transferred by the DIAMETER protocol is in the form of an Attribute Value Pear (hereinafter AVP). Said AVP is used by the base DIAMETER protocol, among other things, for transporting the user authentication information towards the DIAMETER AAA-server. The user name is provided in the User-Name AVP, which allows an NAI format, or in a UTF-8 format consistent with the NAI specification.

A typical scenario of a telecommunication network coupled to an ISP for providing Internet services is the provision of Internet access in a General Packet Radio Service (GPRS) network. In this scenario, a Gateway GPRS Support Node (hereinafter GGSN) may inter-work with an AAA-server typically using RADIUS protocol. Thus, a GGSN acts as a client of a RADIUS AAA-server.

Another scenario is a Wireless Local Area Network (WLAN) accessing Internet through a WLAN Access Point connected to an AAA-server by means of DIAMETER or RADIUS protocols. Thus, a WLAN Access Point may respectively act as a client of a DIAMETER AAA-server, or as a client of a RADIUS AAA-server.

Nowadays, the ISPs store user information for all its users in large backend databases, namely AAA-servers, which the AAA-client may access to. In scenarios where the number of users is very high, this solution is not easily scalable as the size of the databases and the number of queries per second necessarily decrease the network performance. In particular, provided that each ISP has organized its users in a unique large AAA-server, a direct relation between said AAA-server and the requester AAA-client must be maintained during the complete session what, in the case of accounting related transactions, may penalize the expected AAA-server performance.

An immediate solution for an ISP having a very high number of users may be that the ISP needs more than one AAA-server to organize its user information. A first disadvantage of this multiple AAA-server frame is that the security relations between the AAA-client and the different AAA-server become more complicated. A second disadvantage is that the ISP network structure becomes more visible to the AAA-client, which may be a NAS operated by another operator, and thus produces network configuration dependencies between the ISP and the operator of the telecommunication network.

Independently of the disadvantages above, the AAA-clients requesting service from an ISP having a plurality of AAA-servers need to know what AAA-server should be contacted for a particular service request of a certain user. In the absence of other criteria, an AAA-client might perform sequential queries to those AAA-servers of a coupled ISP until finding the appropriate AAA-server in charge of a certain user.

Better performances than for sequential queries may be achieved by interposing an AAA-proxy between the AAA-client and an ISP network having a plurality of AAA-servers. Such AAA-proxy is typically able to differentiate between AAA-servers on a per domain basis. Thus, by making use of user identifiers in a NAI format or likewise, namely username@realm, an ISP may dispose its users amongst different AAA-servers on a per realm basis. The AAA-proxy above is then able to determine the specific AAA-server in charge of all users in a specific domain, namely the domain addressed by the realm shared by such users.

Currently, there is no other criterion for disposing users amongst AAA-servers in an ISP network. In this respect, just the well-known and structured realm in a NAI format above, for example "acme.com", may be used to unambiguously determine a unique AAA-server responsible for a certain domain in an ISP network.

However, there are User-Name formats other than NAI, or not consistently structured, or even unstructured, for which such an AAA-proxy is not able to distinguish among a plurality of AAA-servers and this is a major drawback for the ISPs. For instance, an AAA-proxy receiving service requests from a GGSN acting as a NAS of a GPRS network, the GGSN making use of the Mobile Subscriber ISDN number (MSISDN) as user identifier, is not able to select one of a plurality of AAA-servers for this sort of user identifier.

Moreover, and even for User-Names in NAI formats, said AAA-proxy is not able to distinguish more than one AAA-server for the same domain. That is, all the users given the same realm in a NAI format must be located in the same AAA-server in a certain ISP network. This unique disposition of all users with the same domain or realm in the same AAA-server is still considered a drawback for the ISPs, since more complicated mechanisms for load balancing between AAA-servers of different capacity should be introduced.

A further drawback, where User-Name formats do not include a realm or domain identifier, is that the inclusion of the aforementioned AAA-proxy as such does not solve the identification of a unique AAA-server in charge of a certain user in an ISP network having a plurality of AAA-servers. In this respect, operators of a telecommunication network, where subscriber identifiers do not include a realm or domain identifier, might see this AAA-proxy as a superfluous entity penalizing the AAA-service performance. However, the introduction of this AAA-proxy may overcome, or at least minimizes the two aforementioned disadvantages, security relations and visibility of ISP network structure, especially when the AAA-proxy belongs to the ISP network. In this particular case, the inclusion of such an AAA-proxy benefits the ISP interest whereas penalizes operators of telecommunication networks of this type above.

Thereby, it is a first object of the present invention to provide the means and methods for disposing users of AAA-services amongst a plurality of AAA-servers independently from user identifier schemes, structures and applicable service.

It is a further object of the present invention to make compatible the first object above with the inclusion of an upgraded AAA-proxy in order to solve said first and second disadvantages above, those related to security relations and visibility of ISP network structure. Said upgraded AAA-proxy being able to select the appropriate AAA-server in charge of a given user independently from user identifier schemes, structures and applicable service, thus accomplishing the first object of the present invention.

An interesting start point is found in typical wireless systems of 2nd generation like GSM and ANSI-41 networks. As said wireless systems were getting more and more subscribers, the operators wanted high dimensioned subscriber databases like the Home Location Register (HLR) in order to hold a huge amount of subscriptions, minimizing the O&M activities, and optimizing the routing tables in the Signalling System number 7 (SS7) network. The more recent appearance of Number Portability requirements, in some cases by law regulation, where individual subscribers were moved from one HLR belonging to one operator to another HLR belonging to another operator definitely made the needs for a database selector being a must.

An exemplary description of such a database selector can be found in the international application WO 99/23838 wherein said database selector in a certain network is referred to as Flexible Number Register (FNR). This FNR is the natural entry point in a wireless network of 2nd generation for queries related to those subscribers whose user number series belong to said network independently of what network currently holds the subscriber subscription. That is, said FNR comprises all the user number series addressing such network and also individual user numbers for subscribers ported into this network from another network. Besides, individual user numbers of home subscribers who had been ported to another network are specially marked and have a particular network identifier to reach an entry node in the network where the subscriber currently holds his or her subscription.

Subscriber related queries based on user numbers such IMSI or E.164 formats are addressed to the FNR in a network addressed by said IMSI or E.164 format. These formats correspond to well-structured number series of a predefined length. Then, the FNR determines whether the query should be simply transferred to the appropriate HLR within its own network for subscribers never ported or imported from other networks, or the query should be re-directed to the appropriate network where the subscriber has been exported. All the required routing and addressing mechanisms are carried out at lower signalling layers like at the Signalling Connection Control Part (SCCP) within SS7.

Even though this solution is considered a relevant prior art, it still presents serious limitations for a direct applicability to newer scenarios interconnecting traditional fixed and wireless telephony networks with Internet and Multimedia service networks in large telecommunication systems. For example, this FNR prior art just considers signalling, routing, and addressing in accordance with SS7 principles where subscriber or user identifiers are merely based on structured numbers. Moreover, at least one of the identifiers associated to a subscriber must be structured in such a way that the analysis of such number unambiguously identifies the appropriate HLR. Still another limitation of this previous solution is that neither other newer identifier realms, nor protocol support other than SS7 related upper layers were considered during the development of these 2nd generation wireless networks. Further, there is nothing anticipated in this prior art in respect of service-dedicated servers, such as those related to AAA-services, that must be addressed in response to queries based on corresponding user identifiers.

Thereby, the aforementioned objects of the present invention do not seem to be accomplished or anticipated by the teachings from the application above. In this respect, the provision of means and method for allowing a balanced disposition of users amongst a plurality of AAA-servers independently from user identifier schemes, structures and applicable service is still an object of the present invention. Said means and method, compatible with the introduction of an AAA-proxy between the AAA-client and an ISP having a plurality of AAA-servers for supporting said balanced disposition of users, is still another object of the present invention.

BRIEF SUMMARY OF THE INVENTION

A User Selector Proxy (USP) is provided for supporting a balanced disposition of users independently from user identifier schemes, structures and applicable service while acting as a proxy, thus accomplishing the objects of the present invention.

Therefore, this USP comprises means for receiving Authentication, Authorization, and Accounting (AAA-) service requests from an AAA-client, means for extracting a user domain from a received user identifier, means for identifying the AAA-server in charge of the user domain in an Internet Service Provider (ISP) network, means for submitting the AAA-service request to an AAA-server, means for receiving the corresponding AAA-service response from said AAA-server, and means for returning the AAA-service response to the AAA-client having issued the request. This USP in accordance with the invention also comprises means for analyzing the received user identifier, in either a structured or unstructured format and independently of identifier schemes, in order to determine whether all the user identifier fields, or a User-Name alone, or the user domain alone, or a combination thereof is taken for selection of an AAA-server in charge of this user; and means for selecting an AAA-server in charge of said user in an Internet Service Provider (ISP) network.

For the sake of efficiency, the User Selector Proxy further comprises a storage on individual user basis, or on group of users basis, or both, for storing at least one identifier for each at least one AAA-server in charge of a given individual user or group of users. In particular, this storage may be offered by an internal database comprising relationships between user identifiers and AAA-server identifiers on per user and/or per group of user bases.

A further advantageous disposition of users may be achieved by having a User Selector Proxy adapted for replacing any of the user identifier fields, or any combination thereof, by new ones on an individual user basis, or on group of users basis, or both, or on an AAA-server basis. To this end, relationships like above may further include new user identifier fields, and the USP comprise replacing means for replacing said new user identifier fields.

In addition, and for the sake of compatibility, the User Selector Proxy above is adapted for communicating with an AAA-client with a protocol operating according to RADIUS or DIAMETER protocol specifications.

Thus, this User Selector Proxy can be used as an Authentication, Authorization, and Accounting proxy (AAA-proxy) with which users identified by user identifiers in a non NAI format can also be disposed among a plurality of AAA-servers.

The invention also provides a method for providing Authentication, Authorization, and Accounting (AAA-) services in a telecommunication network coupled to an Internet Service Provider (ISP). This method comprises the steps of receiving an AAA-service request at an AAA-proxy from an AAA-client; extracting a user domain from a received user identifier included in the AAA-service request; identifying at said AAA-proxy the AAA-server in charge of said user in said Internet Service Provider (ISP) network; submitting the AAA-service request from the AAA-proxy to said AAA-server; receiving the corresponding AAA-service response at the AAA-proxy from said AAA-server; and returning the AAA-service response from the AAA-proxy to the AAA-client having issued the request. In this respect, at least the communication between the AAA-proxy and the AAA-client is carried out with a protocol operating according to RADIUS or DIAMETER protocol specifications.

Further, the step of identifying at an AAA-proxy the AAA-server in charge of an indicated user comprises the steps of analyzing the received user identifier, in either a structured or unstructured format, to determine whether all the user identifier fields, or a User-Name alone, or the user domain alone, or any combination thereof is taken for selection of an AAA-server in charge of this user; and selecting an AAA-server in charge of said user in an Internet Service Provider (ISP) network.

In order to improve the efficiency of the method above, a previous step of storing at the AAA-proxy on individual user basis, or on group of users basis, or both, at least one identifier for each at least one AAA-server in charge of a given individual user or group of users.

The method also comprises the advantageous step of replacing at the AAA-proxy any of the user identifier fields, or any combination thereof, by new ones on an individual user basis, or on group of users basis, or both, or on an AAA-server basis.

The invention thus provides a system that comprises a telecommunications network coupled to an Internet Service Provider (ISP) network via a Network Access Server (NAS), wherein the User Selector Proxy (USP) above, acting as an enhanced AAA-proxy, is the entry point to said ISP network, the NAS thus inter-working with the USP.

BRIEF DESCRIPTION OF THE SEVERAL VIEW OF THE DRAWINGS

The features, objects and advantages of the invention will become apparent by reading this description in conjunction with the accompanying drawings, in which:

FIG. 1 represents a partial view of current network architecture showing how a client requests to Internet Service Provider (ISP) networks for Authentication, Authorization and Accounting (AAA-) service, wherein a first ISP network has an AAA-server per domain, and a second ISP does not distinguish domains.

FIG. 2 represents a relevant partial view of a network architecture according to the invention where a client requests to ISP networks for AAA-services, both ISP networks having a plurality of AAA-servers for disposing users, and having a user selector proxy as entry point to each ISP network.

FIG. 3 schematically shows an application of the user selector proxy inter-working with an AAA-client and with a particular AAA-server by using RADIUS protocol.

FIG. 4 basically shows a message flow for the establishment of security associations between an AAA-client and a user selector proxy, and between the user selector proxy and a particular AAA-server.

FIG. 5a shows an exemplary user disposition table storing relationships between users, group of users and the at least one AAA-server in charge of each user or group of users.

FIG. 5b shows, by way of contrast, the conventional disposition of users on a per domain basis among several AAA-servers, each AAA-server in charge of a user domain.

FIG. 6 illustrates an embodiment of a user selector proxy comprising routing means and protocol means separate from and co-operating with processing means.

DETAILED DESCRIPTION OF THE INVENTION

Commonly, an AAA-proxy is adapted for receiving AAA-service requests from an AAA-client. The term AAA-client is a generic form whereas, in particular, a Network Access Server (NAS) for a telecommunication network accessing an Internet Service Provider (ISP) may be in fact an AAA-client. In accordance with FIG. 1, a generic AAA-client (4) is coupled to a first and a second Internet Service Providers (ISP-1, ISP-2) for giving access to Internet network (6). Such an AAA-client (4) might be a NAS connected to a telecommunication network with different user identifiers for different purposes. In this typical architecture, an ISP (ISP-1) handling user identifiers in the NAI form, with explicit indication of a realm or domain, may dispose its users amongst several AAA-servers (1, 2), each AAA-server responsible for a particular domain. Such ISP (ISP-1) may also have an AAA-proxy (5) for determining which particular AAA-server (1, 2) is in charge of a given subscriber at a domain for authentication, authorization and accounting services. On the other hand, an ISP (ISP-2) handling user identifiers in a format other than the NAI form, either structured or unstructured, cannot have any benefit from interposing such an AAA-proxy for accessing its unique AAA-server (3). That is why the AAA-proxy is typically included in an ISP network where a plurality of AAA-servers exist, each AAA-server responsible for a certain domain, instead of being part of the telecommunication network, or part of an access network. Moreover, such AAA-proxy (5) is thus able to hide the internal ISP (ISP-1) topology to its co-operating AAA-clients.

The following describes currently preferred embodiments of means, method and system for allowing a balanced disposition of users amongst a plurality of AAA-servers independently from user identifier schemes, structures and applicable service. In accordance with an aspect of the present invention, a User Selector Proxy (hereinafter referred to as USP) is provided for acting as an upgraded AAA-proxy and thus receiving AAA-service requests from an AAA-client addressing an ISP having a plurality of AAA-servers in charge of balanced dispositions of users.

As shown in FIG. 2, the Internet Service Provider (ISP-1, ISP-2) comprises a plurality of AAA-servers (11, 12, 13, 21, 22, 23) such that they are addressed by a USP (10, 20) which is in turn connected to an AAA-client (4). That is, each Internet Service Provider (ISP-1) (ISP-2) has its users disposed amongst a plurality of AAA-servers (11, 12, 13) (21, 22, 23) in its own ISP network, thus being the USP of each ISP network responsible for analyzing the user identifiers enclosed in the service requests received from the AAA-client (4).

Therefore, the USP (10, 20) comprises processing means to analyse all the user identifier fields, or a User-Name alone, or the user domain alone, or a combination thereof, in order to perform the routing of the AAA-service request received from an AAA-client toward a specific AAA-server in charge of the corresponding user.

In addition to said processing means above, the USP is also provided with an internal Database structure or, more generally speaking, a storage for storing at least one identifier for each at least one AAA-server in charge of a given individual user or group of users. This ensures that at least one AAA-server may be in charge of a particular subscriber or group of subscribers.

Moreover, in accordance with another aspect of the present invention, more than one AAA-server could be assigned to any particular user for redundancy purposes what offer additional and unexpected advantages to classical ISP networks.

In this respect, FIG. 5a and FIG. 5b respectively show the logical relationship and other data that the USP according to the invention and a traditional AAA-proxy comprise. By way of contrast, a storage (51) included in the USP (10, 20) comprises relevant AAA-server data for at least one AAA-server in charge of specific users or group of users, whereas a classical AAA-proxy merely stores (52) the AAA-server addresses on domain premises. Further, said storage (51) included in the USP also comprises modified attributes such as new realm, or new user-Name, or new user identifier fields or combinations thereof for replacing the received ones. Such modification data do also applies per individual user as well as per group of users.

More specifically, an embodiment of the present invention is illustrated in FIG. 5a wherein a possible user disposition table (51) at a USP is presented. The interested reader can appreciate in this table that different users from different domains (Realm.number) are present, some of them being grouped (Gr-number) whereas others remain on individual basis. Where users of different domains are grouped, the at least one AAA-server in charge of all the users in a group is thus marked on group basis rather than on individual basis. On the other hand, users who are not grouped are individually assigned at least one AAA-server in charge of each user on individual basis. Moreover, each particular user may be given a new User-Name or a new Realm for replacing the received one before the AAA-service request being directed to the appropriate AAA-server. Furthermore, both users and groups can be given a new Realm for replacing the received one as well.

This and other exemplary dispositions may be instanced for allowing a balanced disposition of users among a plurality of AAA-server depending on different criteria under Internet Service Provider premises. Anyone of ordinary skill in this art is expected to suggest other embodiments not substantially differing from the approach above and thus comprised under the scope of the present invention.

The USP (10, 20) shown in FIG. 2 thus receives the traffic generated from the AAA-client (4) side and directs it toward the corresponding AAA-server (11, 12, 13) (21, 22, 23) active for the given subscriber and belonging to the applicable Internet Service Provider (ISP-1) (ISP-2).

Therefore, a particular USP (10, 20), as shown in FIG. 6, receives any AAA-service request from an AAA-client for an indicated user through protocol means (50). Then, processing means (53) extracts all relevant user identifier fields which are analysed in co-operation with the internal database storage (51) to determine firstly whether or not any particular user identifier field, or combinations thereof, must be replaced by given new user identifier fields for the indicated user. And secondly, the processing means (53) likely in co-operation with routing means (54) determine an address of a preferred at least one AAA-server in charge of the user, where the AAA-service request is directed. An interested reader can appreciate that the routing means may be included as a part of the processing means without substantially changing the expected technical behaviour.

For example, in a telecommunication network like a GPRS network a Network Access Server (NAS) may be used for accessing an ISP network giving access the GPRS users to the Internet network. Such NAS acts then as an AAA-client issuing the AAA-service requests to a User Selector Proxy (USP) in accordance with the invention. The communication between the USP and the NAS may be carried out with a protocol like RADIUS or DIAMETER, for example, being a user identified by his or her MSISDN.

The sequence diagram shown in FIG. 3 is an illustrative instance of the method for requesting an AAA-service where the protocol used is RADIUS. The NAS issues a RADIUS Access Request including the user identifier toward the User Selector Proxy. Such request is ultimately handled by the processing means (53), which in this preferred embodiment comprises the protocol means (50) and the routing means (54) referred to as separate logical entities in FIG. 6. Said processing means (53) queries (S-31) an internal database (51) in the User Selector Proxy in order to obtain an address for directing the RADIUS Access Request to the appropriate AAA-server in charge of this user. The internal database answers (S-32) to the processing means with such AAA-server address and, optionally, a new user identifier (User Identifier bis). Eventually, the processing means routes the received RADIUS Access Request with the applicable user identifier toward said AAA-server.

Provided that an embodiment of the USP as illustrated in FIG. 6 is preferred for use in the preceding case, the RADIUS Access Request is received at the processing means via protocol means (50). Further, the address of an appropriate AAA-server, returned (S-32) from the internal database (51), is determined by the processing means likely in co-operation with routing means (54). Eventually, the RADIUS Access Request is directed from the processing means (53) via protocol means (50) to the AAA-server.

It should be noted that the traffic flows between the AAA-client (4) and the User Selector Proxy (10, 20) are independent from the traffic flows between the User Selector Proxy (10, 20) and the AAA-servers (11, 12, 13) (21, 22, 23). Consequently, the AAA-client (4) establishes, if needed, security relations or security associations with the User Selector Proxy (10, 20) thus completely hiding the existence of the AAA-servers (11,12, 13) (21, 22, 23) in a particular ISP network (ISP-1, ISP-2) from a security association point of view.

In this respect, FIG. 4 shows a security association establishment in accordance with an aspect of the invention. An AAA-client, which in particular might be a Network Access Server (NAS) for accessing to or from a telecommunication network, issues a Security Association request including a user identifier toward the User Selector Proxy. Such request is handled by the processing means (53) that may comprise the protocol means (50), and the routing means (54) illustrated in FIG. 6, or may follow an alternative embodiment as explained for FIG. 3 though not further depicted. Said AAA-proxy means queries (S-41) an internal database in the User Selector Proxy in order to obtain an address for directing the Security Association request to the appropriate AAA-server in charge of this user. The internal database answers (S-42) to the AAA-proxy means with the AAA-server address, and the AAA-proxy routes the received Security Association request toward said AAA-server.

The invention is described above in connection with various embodiments in a non-restrictive manner but merely illustrative. Those of ordinary skill in this art may modify these embodiments without substantially differing from the scope defined by the following claims.

What is claimed:

1. A method for providing Authentication, Authorization, and Accounting (AAA) services in a telecommunications network coupled to an Internet network wherein a plurality of servers are further communicably coupled to said Internet network, comprising the steps of:

receiving a first AAA-service request from a particular AAA-client associated with a user, said AAA-service request further including a user identifier for identifying said user, said user identifier formatted either in a structured or unstructured format;

identifying a particular one of said plurality of servers storing AAA data associated with said user wherein said step of identifying further comprises determining which fields among the user identifier fields, alone or in combination with the user domain, are taken as a selection criterion for selecting a particular one of said plurality of servers; and selecting an appropriate one from said plurality of servers based on said selection criterion; and transmitting a second AAA-service request to said selected server.

2. The method of claim 1 wherein said step of determining further comprises the steps of:

determining whether said user identifier is required to be replaced with a new user identifier;

replacing said user identifier with said new identifier based on said selection criterion; and including said new user identifier within said second AAA-service request transmitted to said selected server if said user identifier has been replaced; otherwise including said user identifier within said second AAA-service request transmitted to said selected server.

3. The method of claim 2 wherein said step of replacing said user identifier with said new identifier further comprises the step of replacing a portion of said user identifier with new data.

4. The method of claim 1 further comprises the step of grouping a plurality of user identifiers as one particular group and associating a particular one of said plurality of servers with said group.

5. The method of claim 3 further comprises the step of associating a particular one of said plurality of servers with an individual user identifier.

6. The method of claim 1 wherein said step of receiving said first AAA-request uses RADIUS protocol.

7. The method of claim 1 wherein said step of receiving said first AAA-request uses DIAMETER protocol.

8. The method of claim 1 further comprising the steps of:

receiving a AAA-service response from said selected server; and transmitting a second AAA-service response to said AAA-client wherein said second AAA-service request includes said user identifier.

9. A user selector proxy for providing Authentication, Authorization, and Accounting (AAA) services in a telecommunications network coupled to an Internet network wherein a plurality of servers are further communicably coupled to said Internet network and said user selector proxy is communicably coupled to said telecommunications network and said Internet network, comprising:

means for receiving a first AAA-service request from a particular AAA-client associated with a user, said AAA-service request further including a user identifier for identifying said user, said user identifier formatted either in a structured or unstructured format:

means for identifying a particular one of said plurality of servers storing AAA data associated with said user wherein said means for identifying further comprises means for determining which fields among the user identifier fields, alone or in combination with the user domain, are taken as a selection criterion for selecting a particular one of said plurality of servers; and means for selecting an appropriate one from said plurality of servers based on said selection criterion; and means for transmitting a second AAA-service request to said selected server.

10. The user selector proxy of claim 9 wherein said means for determining further comprises:

means for determining whether said user identifier is required to be replaced with a new user identifier;

means for replacing said user identifier with said new identifier based on said selection criterion; and means for transmitting said new user identifier within said second AAA-service request to said selected server if said user identifier has been replaced; otherwise, transmitting said user identifier within said second AAA-service request to said selected server.

11. The user selector proxy of claim 10 wherein said means for replacing said user identifier with said new identifier further comprises means for replacing a portion of said user identifier with new data.

12. The user selector proxy of claim 9 further comprises means for grouping a plurality of user identifiers as one particular group and associating a particular one of said plurality of servers with said group.

13. The user selector proxy of claim 9 further comprises means for associating a particular one of said plurality of servers with an individual user identifier.

14. The user selector proxy of claim 9 wherein said first AAA-request is based on a RADIUS protocol.

15. The user selector proxy of claim 9 wherein said first AAA-request is based on a DIAMETER protocol.

16. The user selector proxy of claim 9 further comprising:

means for receiving a AAA-service response from said selected server; and means for transmitting a second AAA-service response to said AAA-client wherein said second AAA-service request includes said user identifier.

17. The user selector proxy of claim 9 wherein said telecommunications network is coupled to an Internet Service Provider (ISP) network and said user selector proxy is an entry point to said ISP network.

* * * * *